United States Patent [19]

Tybus et al.

[11] 4,272,266
[45] Jun. 9, 1981

[54] APPARATUS FOR THE SEPARATION OF GAS MIXTURES

[75] Inventors: Gerd Tybus, Poing; Hartmut Neuking, München, both of Fed. Rep. of Germany

[73] Assignee: Messerschmitt-Bölkow-Blohm Gesellschaft mit beschränkter Haftung, Munich, Fed. Rep. of Germany

[21] Appl. No.: 25,274

[22] Filed: Mar. 29, 1979

[30] Foreign Application Priority Data

Apr. 7, 1978 [DE] Fed. Rep. of Germany ....... 2815050

[51] Int. Cl.³ .............................................. B01D 53/24
[52] U.S. Cl. ......................................... 55/392; 55/17; 55/397; 55/398; 55/DIG. 14
[58] Field of Search ................... 55/17, 348, 347, 397, 55/398, 392, 461, DIG. 14

[56] References Cited

U.S. PATENT DOCUMENTS

| | | |
|---|---|---|
| 3,362,131 | 1/1968 | Becker ................................ 55/17 |
| 3,668,080 | 6/1972 | Weber et al. ........................ 55/17 |
| 3,708,964 | 1/1973 | Becker et al. ....................... 55/17 |
| 3,747,306 | 7/1973 | Wikdahl .............................. 55/17 |
| 3,853,528 | 12/1974 | Wodrich et al. .................... 55/17 |
| 3,877,892 | 4/1975 | Bley et al. ........................... 55/17 |
| 3,989,483 | 11/1976 | Becker et al. ....................... 55/17 |
| 4,033,021 | 7/1977 | Tybus et al. ........................ 55/17 |

*Primary Examiner*—Frank W. Lutter
*Assistant Examiner*—Gregory N. Clements
*Attorney, Agent, or Firm*—Toren, McGeady and Stanger

[57] ABSTRACT

A device for separating gas mixtures having different molecular weights includes a cylindrical central body having longitudinal deflection channels formed in a circumferential surface with a plurality of elongate separating elements being grouped about the periphery of the central body with each of the separating elements being formed on the side of each separating element facing the central body with a pair of tapered legs defining therebetween a concave prismatic channel. Each of the tapered legs extends into a deflection channel of the central body and terminal edges of the legs operate to generate a nozzle effect.

16 Claims, 6 Drawing Figures

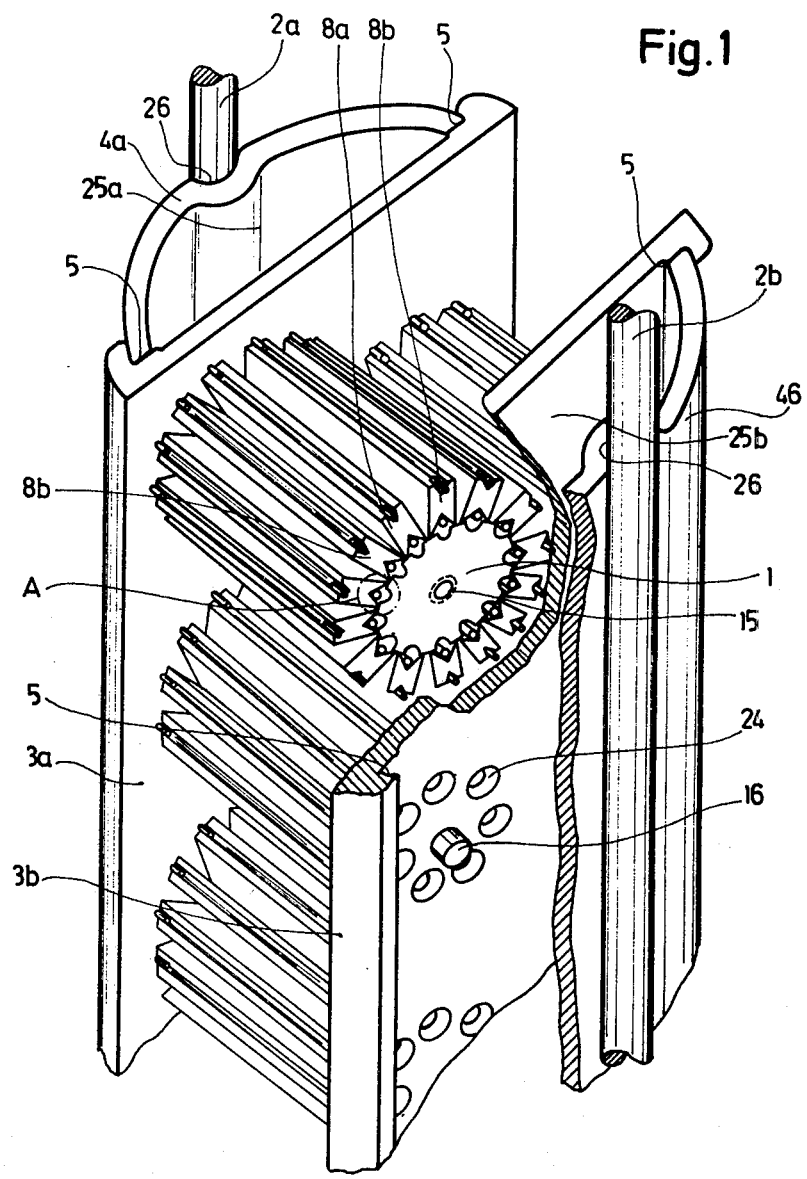

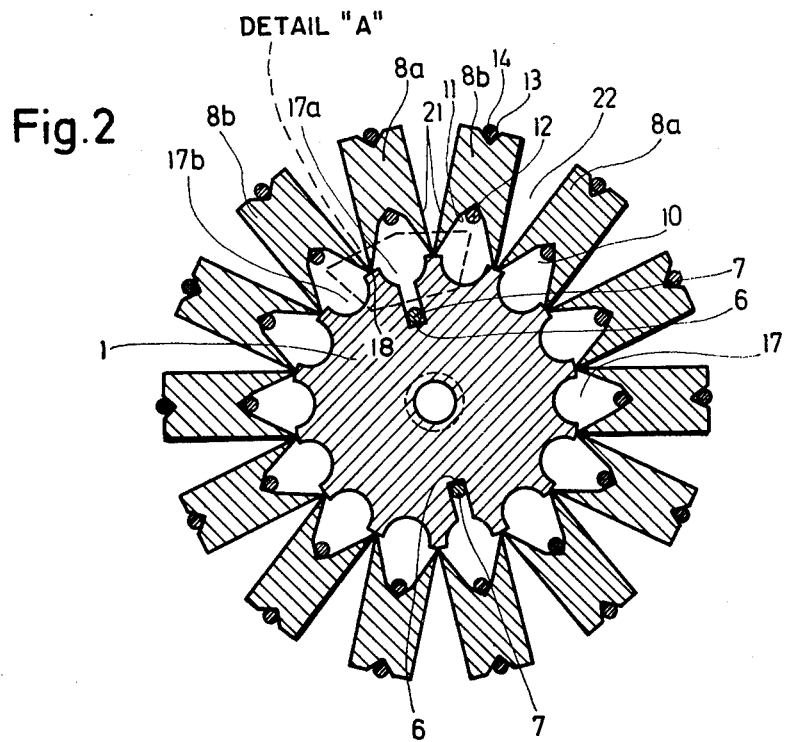
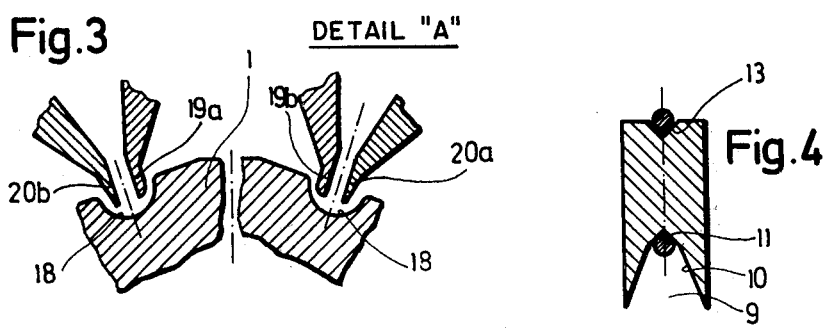
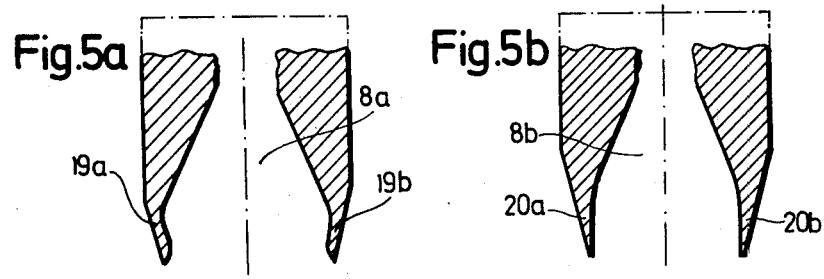

APPARATUS FOR THE SEPARATION OF GAS MIXTURES

BACKGROUND OF THE INVENTION

The invention relates generally to gas separation apparatus and more particularly to a separating device wherein separation of gas mixtures is accomplished by gas nozzle separation techniques or by utilizing the principle of separating nozzles.

The separation of gas or vapor mixtures in accordance with the separating nozzle principle is known. Because of different masses of the components of the mixture, deflection of an initial mixture of higher velocity will lead to different centrifugal forces and lighter fractions of the gas will follow a generally smaller flow radius than the heavier gas fractions. By means of gas peeler elements, the fractions may be thus conducted to different flow channels.

Techniques for constructing suitable devices for performing the separating methods are known and examples of prior art relating thereto are U.S. Pat. Nos. 3,668,080 and 4,033,021.

Difficulties arise in utilizing the separating nozzle method and the underlying basis for these difficulties resides especially in the necessity for achieving structural tolerances with economically feasible building techniques, the structural tolerances being in the range of $10^{-6}$ m. Furthermore, difficulties encountered relate to obtaining uniform gas supply to the separating region and an obtainable throughput through the separating apparatus.

The present invention is particularly directed to the task of providing an apparatus of the aforementioned type which will provide a longer length for the separating nozzles with the same overall structural size, as compared with structures known in the prior art. Moreover, the invention provides a device which is capable of insuring a uniform supply of gas to the separating nozzles and which will allow economical production techniques.

SUMMARY OF THE INVENTION

Briefly, the present invention may be described as a device for the separation of gas mixtures having different molecular weights comprising a generally cylindrical central body having an outer circumferential surface with a plurality of deflection channels formed in said circumferential surface, and a plurality of elongate separating elements grouped about the periphery of said central body, each of the separating elements having a side facing toward the central body and each being formed on said side facing the central body with tapered legs defining therebetween a concave prismatic channel. Each of the legs of the separating elements extends into the deflection channels of the central body and is provided with terminal edges to generate a nozzle effect therebetween.

The separating elements are located to extend adjacent each other peripherally about the central body. The central body is also formed with guide channels which are arranged to face radially outwardly of the central body at locations in opposed facing relationship with the prismatic channels of the separating elements.

The task of the present invention is solved in that the separating elements are radially grouped about the periphery of the cylindrical or polygonal central body which is provided on its circumference with the deflection channels, and in that the separating elements are formed as rails or longitudinal structures having a side which faces toward the central body and which is constructed as an internal prism, with the legs of the separating element projecting into the deflection channels as nozzle-generating edges of action.

In accordance with an embodiment of the invention it is provided that the length of the separating nozzle elements coincides with the length of the central body. As a result, the two structural elements may be easily integrated in a structural sense.

In accordance with the principle of separating nozzles, the nozzles for the gas inlet into the deflection channel and those for effecting gas peeling at the outlet are constructed differently. In order to take this principle into account in a simple manner, each alternate separating element is provided with an edge of action serving for the gas inlet and each subsequent or adjacent separating element is provided with the edge of action which operates to effect gas peeling. Thus, with this arrangement correct locations of gas inlet and gas peeling edges of action of a flow channel will result automatically within the flow channel.

As previously mentioned, the gas guide channels are advantageously formed in that the separating elements are constructed as internal prisms. In order to achieve a further improvement of the flow conditions of the apparatus it is moreover provided that the central body is formed with guide channels which correspond to the prismatic internal spaces of the separating elements. In order to avoid requiring creation of special channels for the light fraction of the gas to be separated, the apparatus of the invention provides that the separating nozzle elements are shaped on the outer sides of legs thereof in such a way that they form gas guide channels for the light fraction of the gas to be separated.

The separating elements and the central body may be connected in various ways. An approach which is especially simple and economical, due to the fact that it is, among other things, also gas tight, is one in which the central body is firmly locked or held together with the separating elements by means of support plates.

The support plates and the central body or the separating elements need be connected merely through a screw for each central body so that the support plates are connected to the central body through the screw or threaded connection in a tight, firm manner or by means of clamping action on the separating elements.

Correct permanent positioning of the central body relative to the support plates may be achieved by means of pins which are inserted in the support plates and which extend through grooves formed in the central body to receive the pins.

In the same manner, the separating elements may be positioned relative to the support plate or relative to the central body by the utilization of inner and outer pins which are inserted in the support plates and which engage the separating elements in supporting relationship therewith.

The pins which position the separating elements could, for example, be arranged to the right and left of the elements. However, in order to reduce the requirement of the number of pins involved and in order to insure permanent positioning, the prismatic internal spaces of the separating elements are extended to form a prismatic taper which serves to receive the inner pins. On the outer side of the separating elements, opposite the side facing the central body, another prismatic taper may be provided for receiving the outer pins.

In order to introduce the initial gas or for removing the separated fraction, the support plates may themselves be provided with appropriately arranged openings in a relatively simple manner so that the support plates will be provided with gas supply and discharge openings, with the gas supply and discharge openings being arranged to correspond with the appropriate gas guide channels. The openings may be constructed and shaped to effect desired dynamic flow characteristics. As will be apparent to those skilled in the art, flow characteristics may be improved by forming the openings as nozzles and so as to reduce friction losses.

The collection of the gases or the separated fraction after being discharged through the openings in the support plate is accomplished, in accordance with a further embodiment of the invention, in that the support plate will have guides at their outer sides with shells defining gas chambers being placed into the guides in a gas-type manner.

A plurality of devices may be placed one above the other and for this purpose the shells may be provided with recesses which serve to receive tie rods.

Depending upon the desired capacity of the apparatus, any number of operative units may be arranged in operative relationship relative to each other and for this purpose, several central bodies may be arranged between the support plates by means of appropriate mounting elements.

The apparatus will provide significant advantages as compared with conventional devices. Although, for example, the entire effective length of the separating nozzle may be easily multiplied at any given structural size, the individual length of the separating nozzle is reduced by an amount on the order of a decimal power and more. Accordingly, it will be found that simpler production methods may be utilized. A higher physical efficiency may be obtained together with cost reduction. The separating elements may assume a plurality of functions and still provide a suprisingly simple geometric shape. The mentioned functions may be, for example, the formation of gas guide channels by a suitable arrangement relative to each other and simultaneous support of the nozzle generating element.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the Drawings:

FIG. 1 is a perspective view partially in section showing apparatus in accordance with the present invention;

FIG. 2 is a sectional view showing the arrangement of separating elements with a central body;

FIG. 3 is a partial sectional view showing a detail A of the apparatus;

FIG. 4 is a sectional view showing a separating element of the invention; and

FIGS. 5a and 5b show, respectively, two characteristic embodiments of the separating elements.

DETAILED DESCRIPTION OF THE PREFERRED EMBODIMENT

Referring now to the drawings, like reference numerals are used in order to refer to similar elements throughout the various figures of the drawing inasmuch as all of the figures show different views of essentially the same body.

In FIG. 1, the device of the present invention is depicted as essentially comprising a central body 1 having seven separating elements 8a and 8b arranged in alternating sequence about the circumference of the separating body. The arrangement of the separating elements 8a and 8b about the circumference or periphery of the central body 1 is best shown in end view in FIG. 2. In the assembly of the invention, two support plates 3a and 3b are provided on opposite ends of a construction such as that shown in FIG. 1 wherein a plurality of individual units are mounted between the support plates, with each of the individual units comprising a central body 1 and a plurality of separating elements 8a, 8b alternately arranged around the circumference of the central body 1. In addition, in the assembly of FIG. 1, two shells 4a and 4b are arranged in operative engagement with the support plates 3a and 3b and a pair of tie rods 2a, 2b extend in supporting engagement with the shells 4a, 4b.

The support plates 3a, 3b are each provided with guide grooves 5 for receiving therein the ends or sides of the shells 4a, 4b. The central body 1 is formed with at least two continuous grooves 6 which are staggered relative to each other by 180°. Pins 7 which are inserted in the support plates 3a, 3b project into the grooves 6 and thereby operate to position the central body 1 in relationship to the support plates. The seven separating elements 8a and the seven separating elements 8b are each arranged in alternating juxtaposition in accordance with the same basic principle relative to the central body. Each separating element, as best seen in FIG. 4 has at its side 9 facing toward the central body 1 a prismatic concave interior space or channel 10 which extends with a steeper inclination continuing into another prismatic channel 11 beginning at a suitable distance from the central body. On the side facing the opposite direction of the separating element, there is also provided a prismatic indentation or groove 13. Pins 12, 14 which are inserted in the support plates project into the prisms 11 and 13 and, thus, they operate to position the separating elements in the assembly of the invention.

The support plates, the central body and the separating elements are held together by means of screws 16 which are threadedly engaged through the support plates with threads 15 formed in the central body 1. The central body 1, the separating elements 8a, 8b and the support plates 3a, 3b form an arrangement whereby the separating elements and the central body may be closed off in a gas-tight manner.

At its periphery, the central body 1 is formed to define together with the separating elements 8a, 8b gas guide channels 17a, 17b with deflection channels 18 being defined on the periphery of the central body 1 intermediate each pair of gas guide channels 17a, 17b. The separating elements are arranged in such a manner that the prismatic interior channels 10 are defined between a pair of legs such that the separating elements 8a have two edges of action 19a, 19b which serve for the gas inlet, with the separating elements 8b having two edges of action 20a, 20b which serve for gas peeling (see FIGS. 5a, 5b). As a result of the selected arrangement, the edges of action will always project into the deflection channels 18 as pairs with an edge 19 and an edge 20. Simultaneously, each of the internal prismatic channels 10 will form a gas guide channel 17a or 17b. Accordingly, the separating elements 8a will define a channel 17a which serves for supplying the initial gas, while the separating elements 8b enclose a channel 17b which receives the heavy fraction, etc. The light fraction enters the channel space 22 defined by the outer sides 21 of the legs and it may be drawn off therefrom.

The initial gas passes through openings in the support plate 3a, not shown in the drawings since they are not visible in the view of FIG. 1, with the gas passing into the guide channels 17a. The heavy fraction is discharged through the channels 17b and openings 24 in the support plate 3b, the openings 24 coinciding with or being generally related to the openings in the plate 3a which are not shown. The shape of the openings 24 formed in the plate 3b, and the shape of the openings (not shown) formed in the plate 3a will be generally conical in order to provide dynamic flow characteristics. Together with the shells 4a, 4b, the support plates 3a, 3b form gas chambers 25a and 25b. The gas chamber 25a contains the initial gas, and the gas chamber 25b contains the heavy fraction.

As will be seen from FIG. 1, a plurality of units formed in accordance with the present invention may be integrated between a pair of support plates. Accordingly, as a result of the sandwich-like design, an optimum structural configuration may be created.

The design is selected in such a way that an advantageous and cost-saving chip removing technique in accordance with U.S. Pat. No. 4,033,021, may be used without problems. However, the apparatus is of course not confined to this specific production method.

The apparatus in accordance with the invention may also be provided with a plurality of units arranged one above another in appropriate numbers. In this case, the tie rods 2a, 2b may serve as mechanical support elements. Of course, instead of the support plates and shell, suitable tube sections may also be utilized as the support elements.

While a specific embodiment of the invention has been shown and described in detail to illustrate the application of the inventive principles, it will be understood that the invention may be embodied otherwise without departing from such principles.

What is claimed is:

1. Apparatus for the separation of gas mixtures having different molecular weights into a heavy fraction and a light fraction comprising: generally cylindrical body means having outer circumferential surface means; longitudinal deflection channel means formed in said outer surface means; gas channel defining means arranged to define together with said body means a first plurality of gas guide channels spaced apart circumferentially about said body means and a second plurality of gas guide channels interposed between pairs of said first plurality of gas guide channels; said gas channel defining means including pairs of tapered legs extending into said deflection channel means and having terminal edges spaced from said deflection channel means and cooperating therewith to separate said gas mixture into a light fraction and a heavy fraction, with said light fraction flowing to between adjacent pairs of said gas guide channels and with said heavy fraction flowing into said second plurality of gas guide channels; inlet means for introducing a gas mixture into said first plurality of gas guide channels; outlet means for said second plurality of gas guide channels; and outlet means for said light fraction in flow communication to between adjacent pairs of said gas guide channels.

2. Apparatus for the separation of gas mixtures having different molecular weights into a heavy fraction and a light fraction comprising: generally cylindrical body means having outer circumferential surface means; longitudinal deflection channel means formed in said outer surface means; a plurality of elongate separating elements located about the periphery of said cylindrical body means each having a side facing toward said body means; said separating elements being arranged to define together with said body means a first plurality of gas guide channels spaced apart circumferentially about said body means and a second plurality of gas guide channels interposed between each pair of said first plurality of gas guide channels; each of said separating elements being formed on said side facing said body means with a pair of tapered legs having terminal edges, each of said legs extending into said deflection channel means with said terminal edges spaced from said deflection channel means and cooperating therewith to separate said gas mixture into a light fraction and a heavy fraction, with said light fraction flowing to between said separating elements and with said heavy fraction flowing into said second plurality of gas guide channels; inlet means for introducing a gas mixture into said first plurality of gas guide channels; gas outlet means in flow communication with said second plurality of said gas guide channels for said heavy fraction; and gas outlet means in flow communication to between said separating elements for said light fraction.

3. Apparatus according to claim 2 wherein said body means and said separating elements are each formed with length dimensions which coincide with each other.

4. Apparatus according to claim 2 wherein said separating elements are located to extend adjacent each other peripherally about said body means, with the terminal edges of said separating elements comprising a first plurality of terminal edges configured to effect gas supply and, a second plurality of terminal edges configured to effect gas peeling, said first and said second plurality of terminal edges being alternately arranged relative to each other.

5. Apparatus according to claim 4 wherein said body means further includes guide channels arranged in opposed facing relationship with said gas guide channels and coincident therewith.

6. Apparatus according to claim 5 wherein said adjacent separating elements define therebetween gas guide channels for the light fraction of the gas to be separated.

7. Apparatus according to claim 2 further including support plates having said body means and said separating elements joined thereto to fixedly hold said body means and said separating elements together in operative relationship.

8. Apparatus according to claim 7 wherein said body means is connected with said support plates by a screw connection.

9. Apparatus according to claim 7 wherein said body means is formed with mounting grooves, said body means being mounted on said support plates by pins inserted into said support plates and extending through said mounting grooves.

10. Apparatus according to claim 7 wherein said separating elements are held in position by means of inner and outer pins inserted in said support plates and wherein said gas guide channels are formed with an interior prismatic portion receiving therein said inner pins, said separating elements having on a side thereof opposite said side facing said body means concave prismatic grooves receiving therein said outer pins.

11. Apparatus according to claim 7 wherein said gas inlet means and said gas outlet means for said heavy fraction include, respectively, gas supply and gas discharge openings which are arranged in axial alignment respectively with said first and second plurality of gas guide channels.

12. Apparatus according to claim 7 wherein said support plates are provided on their outer sides with guide channels, said apparatus further including shells supported in gas tight engagement with said guide channels defining together with said support plates a gas chamber therebetween.

13. Apparatus according to claim 12 wherein said shells are formed with recesses arranged to receive tie rods therein.

14. Apparatus according to claim 7 wherein said cylindrical body means comprises a plurality of generally cylindrical bodies arranged between said support plates.

15. Apparatus according to claim 7 wherein said apparatus is formed as an assembled arrangement composed of a plurality of individual units each supported relative to each other by tie rods, each of said units being composed of a plurality of generally cylindrical bodies, of which said body means is comprised, mounted between support plates with each of said bodies having individual pluralities of said separating elements arranged circumferentially thereabout.

16. Apparatus according to claim 12 wherein said support plates and said shells are constructed as tube sections of solid material.

* * * * *